United States Patent [19]

Schwarzbich

[11] Patent Number: 5,522,488
[45] Date of Patent: Jun. 4, 1996

[54] ADJUSTING APPARATUS FOR ADJUSTING AN AUTOMOBILE SEAT

[76] Inventor: Jörg Schwarzbich, Wertherstrasse 15, 33615 Bielefeld, Germany

[21] Appl. No.: 363,351

[22] Filed: Dec. 23, 1994

[30] Foreign Application Priority Data

Dec. 23, 1993 [DE] Germany ............................ 9319848 U

[51] Int. Cl.$^6$ .......................... B60N 2/22; F16D 41/066; F16D 43/02
[52] U.S. Cl. .............................. 192/8 R; 192/38; 192/47; 192/95; 192/101
[58] Field of Search ................... 192/8 R, 47, 95, 192/100, 101, 38, 44; 297/374, 361.1; 188/82.3, 82.34

[56] References Cited

U.S. PATENT DOCUMENTS

| | | | |
|---|---|---|---|
| 1,152,075 | 8/1915 | Buschmann | 192/44 X |
| 1,726,329 | 8/1929 | Aiken | 192/47 |
| 1,930,711 | 10/1933 | Fishburn | 192/47 |
| 3,243,023 | 3/1966 | Boyden | 192/44 X |
| 4,901,831 | 2/1990 | Ito et al. | 192/38 |
| 5,248,017 | 9/1993 | Schwarzbich | 297/361.1 X |

*Primary Examiner*—Rodney H. Bonck
*Attorney, Agent, or Firm*—Burns, Doane, Swecker & Mathis

[57] ABSTRACT

A device includes a driven member arranged to be moved to adjusted positions by a driving member. The driving and driven members are arranged to rotate about a common axis of rotation. The driving member is axially movable between first and second axial positions. In its first axial position, the driving member transmits rotational movement to the driven member in both directions of rotation, and the driven member is locked against rotation relative to the driving member. When the driving member is in its second axial position, the driven member is able to rotate relative to the driving member in both directions of rotation. The driven member can be connected to a seat back of an automobile seat, and the driving member can comprise a hand wheel for effecting adjustment of the seat back when the hand wheel is in its first axial position. The seat back is freely movable relative to the hand wheel when the hand wheel is in its second axial position.

16 Claims, 2 Drawing Sheets

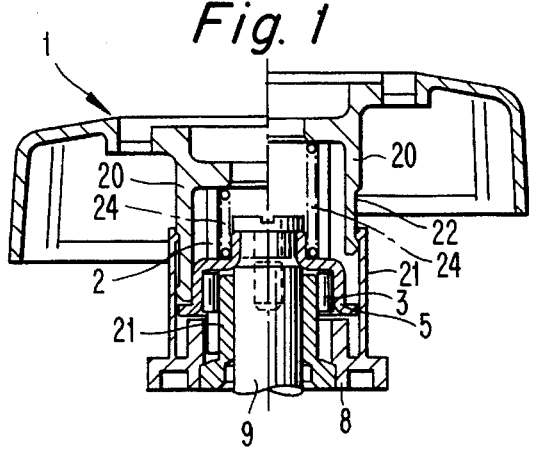
Fig. 1
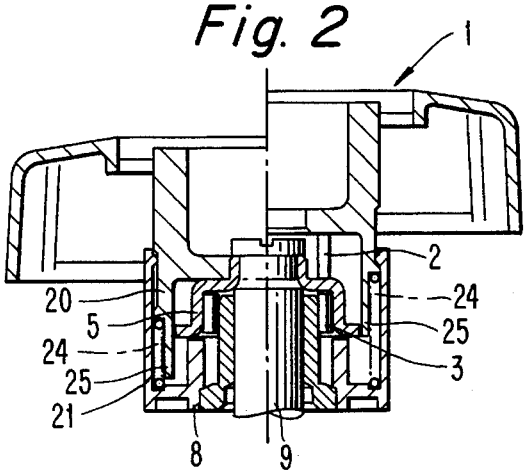
Fig. 2
Fig. 3

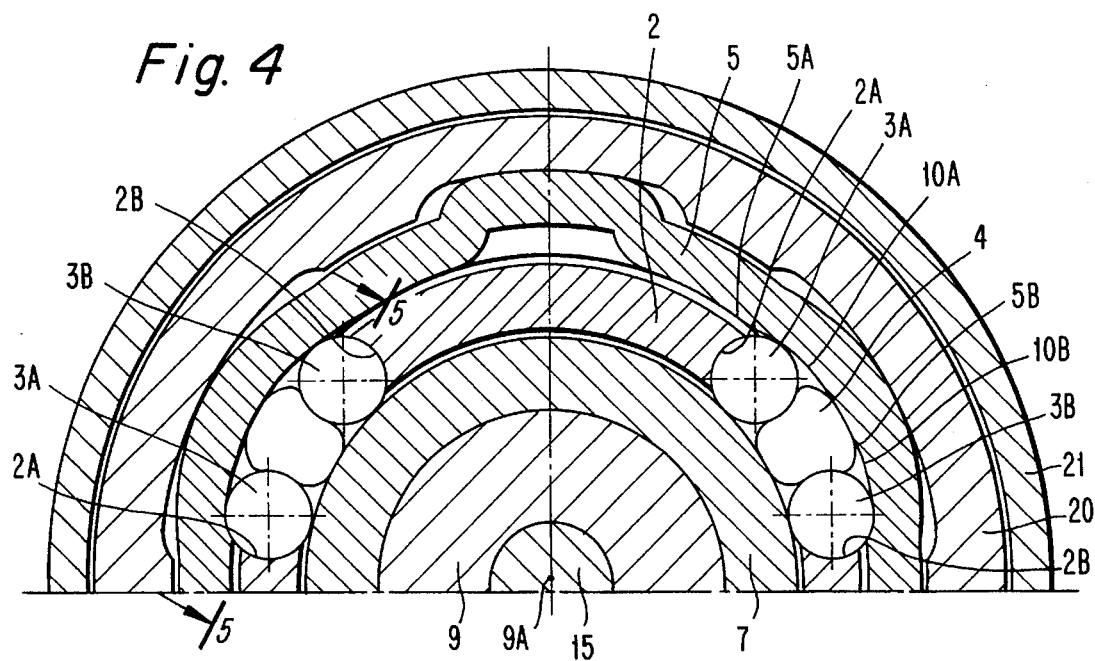
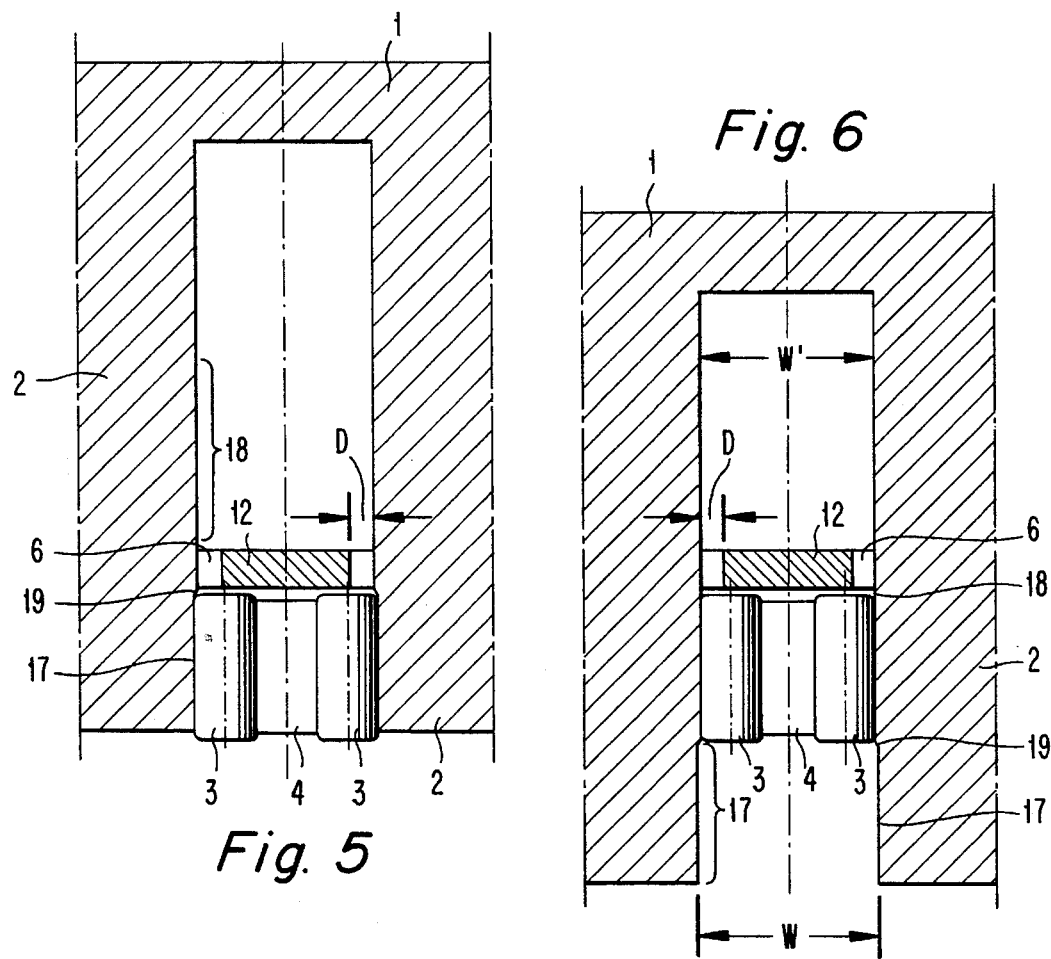

ADJUSTING APPARATUS FOR ADJUSTING AN AUTOMOBILE SEAT

BACKGROUND OF THE INVENTION

The invention relates to a device such as an adjuster for a car seat, for enabling a rotary driving member to transmit rotary movement to a driven member in either direction of rotation, while locking the driven member against rotation relative to the drive member.

Devices of this type are known; and one is disclosed in U.S. Pat. No. 5,248,017 wherein an apparatus includes a driving gear for rotating a driven pinion in either of two directions for adjusting the driven pinion, and wherein the pinion is automatically locked in the adjusted positions. Such devices are especially suited as seat adjusters in motor vehicles. A frame-mounted hub is provided for these devices on which the driving wheel and the pinion wheel are mounted. Pairs of clamps are surrounded by a ring attached to the pinion wheel. The inner surface of the pinion wheel includes slanted surfaces for clamping the clamps against the hub. In the locked position, the clamps are pressed against the hub and these slanted surfaces by spring elements and upon rotation of the driving wheel, catches carried by the driving wheel displace the clamps from their locked position to permit the pinion wheel to be rotated by the driving wheel. The clamps lock the pinion wheel in its adjusted positions.

As explained above, the primary application area of this type of device is in the adjustment of the seat back of seats in motor vehicles. Two mutually exclusive types of devices have been used for the adjustment of seat backs. In a first type, a notch style adjuster is operated by means of a release lever or a catch lever, whereby following the release of the catch lever the inclination of a spring-biased seat back is adjusted by applying pressure to the seat back. This construction is used in the United States of America in particular. On the other hand, a continuous adjuster is widely used in Europe, in which case, a continuous seat back adjuster of the type described earlier herein is operated by a driving wheel in the form of a hand wheel to rotate a driven pinion connected to the seat back to achieve an infinite number of adjusted positions.

Both constructions have advantages and disadvantages. The notch style adjuster allows the release of the seat back and quick adjustment into the desired position by means of a hand lever. This is especially beneficial in the case of two-door motor vehicles in which one wishes to reach the back seat, because the seat back can be tilted forward quickly, so that the back seat is more accessible. To that end, it is necessary only to release the lever; whereupon the seat back of the front seat is pushed forward a by a built-in spring. Except for the fact that the adjustment of the seat back is only possible in specific notched positions, the operation is also not without problems, since the seat back must be pushed back into the desired position against the action of the restoring spring after releasing the catch lever. Since constructions of this type are hardly free from play, they tend to rattle or clatter upon movement of the vehicle.

In the construction involving a continuous adjustment it is not possible to quickly tilt the seat back forwardly to access the back seat in two-door vehicles. That required an additional construction that is completely independent of the seat adjustment, which made it possible to push the seat back of the front seat forward. This, however, involves a considerable additional expenditure of money and labor.

SUMMARY OF A PREFERRED EMBODIMENT OF THE INVENTION

The invention has the task of creating a device with which it is simply and economically possible to combine both of the above-described constructions (i.e. a continuous adjuster and a quickly releasable adjuster) in a single device such that the advantages of each can be utilized. The solution to this task is a device of the kind mentioned initially, characterized in that the length of the catches is approximately double the length of the clamps and a length range of the catches is a little wider than the other length range, so that both clamps can be pushed out of the locked position. The seat back of the front seat of a motor vehicle is then freely tiltable and can tilt forward under the action of spring, to make accessing the back seats of two-door vehicles easier. The seat back is then tilted back at least roughly into the desired position against the action of the spring and the turning handle is pushed back axially, so that the continuous fine adjustment of the incline can be accomplished.

In particular a neck-shaped flange is arranged on the driving wheel of the gear, which is directed to a corresponding and oppositely arranged flange on the pinion wheel, whereby it engages in that or encompasses it. Both flanges are provided with opposing projections on their ends to limit them to axial movements, whereby the shifting path of the flanges corresponds to at least double the axial length of the catches, which are connected with the driving wheel on one side, exhibit intakes on one of their length ranges and are constricted in their width, whereby this length area corresponds to the length of the clamps.

It is perceivable that the invention achieves both functions with surprisingly simple and relatively little enlargement or supplementation of the known gear mentioned initially, whereby only negligible additional costs will occur in production and assembly.

Further features and advantages of the invention can be understood from the claims and the following detailed description.

BRIEF DESCRIPTION OF THE DRAWINGS

The invention will be explained by use of illustrative examples with relation to the individual drawings that follow. In the figures are shown:

FIG. 1: longitudinal sectional view of a device according to the invention in two positions;

FIG. 2: a view similar to FIG. 1 of a second embodiment of the invention;

FIG. 3: an enlargement of FIG. 1, wherein a continuous adjustment position is shown in the right half, and a quick-release position is shown in the left half;

FIG. 4: Cross section taken along Line 4—4 in FIG. 3;

FIG. 5: Cross section taken along line 5—5 in FIG. 4 when the driving member is in one of its axial positions; and FIG. 6: a view similar to FIG. 5 when the driving member is in the other of its axial positions.

DETAILED DESCRIPTION OF PREFERRED EMBODIMENTS OF THE INVENTION

Two embodiments of the invention are depicted in the drawings. FIGS. 1 and 3–6 depict a first embodiment, and FIG. 2 depicts a second embodiment. FIGS. 5 and 6 would also be applicable to the embodiment of FIG. 2. Attention is directed to FIGS. 3 and 4.

Extending from a driving wheel 1, which is portrayed as a hand wheel in the example, are catches 2 (see FIG. 4) which are arranged in a circle about an axis 9A and which extend through respective openings 6 formed in a clamp ring 5. Inside the clamp ring 5, clamps 3A, 3B are arranged in pairs between the catches 2. Between the two clamps of each pair is arranged a spring element 4, which causes clamps 3A, 3B to press against the side surfaces 2A, 2B of catches 2.

The clamp ring includes an inner wall 5A that includes slanted surfaces 10A, 10B arranged in pairs, whereby each pair of slanted surfaces 10A, 10B is coordinated with a pair of clamps 3A, 3B. The diameter of the clamp ring 5 is enlarged at region 5B between the slanted surfaces 10 of the pair, in the area of the spring element 4.

Situated radially inwardly of the clamp ring 5, the catches 2 and the clamps 3A, 3B is an inner ring 7, which is fixedly connected to a pinion wheel 8 that operates in conjunction with a step-down gear not shown here. Driving wheel 1 and pinion wheel 8 are mounted on a common axle 9. Alternatively, this axle 9 can be set in a frame and the clamp ring 5 connected with a bearing casing of the pinion gear, instead of being mounted on the axle. In the example portrayed here, the axle 9 is connected via the clamp ring to the driving wheel 1. One end of the clamp ring 5 includes a radial flange 12 in which the openings 6 are provided. That flange 12 extends toward the axle 9 and terminates in an axial flange 13 which extends away from the clamps 3A, 3B. The flange 13 is abutted by a head 14 of a fastener 15 which screws into the axle 9. A radial flange 16 extends outwardly from an opposite end of the clamp ring.

The pinion wheel 8 is connected to a member to be adjusted, e.g., a back rest of a vehicle seat (not shown), and the driving wheel 1 is rotatable to make such adjustment. Rotation of the driving wheel 1 can be manual (if a hand wheel is used) or by a motor drive.

The driving wheel 1 is also movable axially between an extended (normal) position and a depressed position, shown at the right and left halves, respectively, in FIG. 3. In the normal (right-half) position, the apparatus is capable of achieving the conventional function of adjusting the back rest to an extent proportional to the amount of rotation of the driving wheel, i.e. a continuous or infinite adjustment. In the left-half position, the pinion wheel 8 is released for free rotation relative to the driving wheel for a rapid adjustment of a seat back.

Assuming that the driving wheel is in the extended (normal) position, then upon turning the driving wheel 1 clockwise in FIG. 4, the driving wheel 1 and integral catches 2 will rotate clockwise relative to the outer clamping ring 5 until a small distance D formed between the catches 2 and the sides of the openings 6 is eliminated. As a result of that relative rotation, the clamps 3A directly contacted by the side surfaces 2A of the catches 2 will be pushed out of clamping (i.e. wedging) relationship with the surfaces 10A and the outer surface of the inner ring 7 counter to the bias of the spring element 4, while causing the other clamps 3B to be pushed into clamping relationship with the surfaces 10B and the outer surface of the inner ring 7. Thus, when the distance D has been eliminated, the inner ring 7 will be clamped to the clamp ring 5, and both rings 5 and 7 (along with pinion wheel 8) will be rotated clockwise by the driving wheel 1 to adjust the seat back in one direction.

The same, but reverse, action will occur if the driving wheel 1 is rotated counterclockwise, to adjust the seat back in the opposite direction.

When the driving wheel 1 is in its normal (extended) position, rotation of the pinion wheel of (and inner ring 7) relative to the driving wheel 1 is opposed by the frictional engagement of the outer surface of the ring 7 with the clamps 3A, 3B and the springs 4 to lock the seat back in place.

As will now be explained, however, when the driving wheel is in a depressed condition (shown at the left side of FIG. 3), the pinion wheel 8 (and seat back) is freely rotatable in either direction relative to the driving wheel.

The catches 2 on the driving wheel 1 are at least twice as long as each of the clamps 3A, 3B. The catches 2 are divided into two length ranges 17, 18, each of which corresponds to a length of each of clamps 3A, 3B. A space formed between adjacent catches 2 in the outer length range 17 has a width W which is greater than a width W' of a corresponding space disposed at the inner length range 18, because between these two length ranges 17 and 18 a slanted transition step 19 is formed. The driving wheel 1, portrayed as a hand wheel in this embodiment, can be pushed in an axial direction (downwardly in FIGS. 3, 5, 6) so that the catches 2 can be shifted in an axial direction within the openings 6. As a result, the clamps will rest against either the wide range 17 (FIG. 5) or the narrow range 18 (see FIG. 6). When resting against the narrow range 18 all clamps 3A, 3B are pressed against the respective spring elements 4 and are thereby pushed out of their clamped or locked positions. In this way, the pinion wheel 8 is no longer locked. That means that the seat back connected with the pinion wheel can be rapidly moved freely and adjusted to any angle. For example, a spring (not shown) can be arranged in a known fashion, to push the seat back to the most forward angle possible. After that, the seat back can be tilted freely against the action of the spring into a desired position and angle. To lock the seat back in this position the driving wheel 1 (handwheel) is shifted axially so that the clamps 3A, 3B lie in the wider range 17 between the catches 2, so that the clamps 3A, 3B are pushed by the spring element 4 to their clamped positions and thereby stop any rotational movement introduced by the pinion wheel.

In the normal (extended) position (see FIG. 5), in which the clamps 3A, 3B lie in the wider range 17 of the catches 2, the device functions as described initially, whereby the driving wheel 1 can rotate the pinion wheel and the pinion wheel cannot rotate independently of the driving wheel. The car seat back can be tilted, forward and backward, in any desired angle by rotation of the hand wheel (driving wheel 1) and the adjusted angle position of the seat back is safely locked, so long as the hand wheel stays in the axially extended position.

To achieve a good and safe control of the driving wheel 1 (hand wheel) while shifting between the two positions ("pulled out" and "pushed in"), a neck-shaped flange 20 is provided on the driving wheel 1, toward which a corresponding neck-shaped flange 21 juts out form the pinion wheel, whereby both flanges 20 and 21 axially overlap. In one of the two flanges, in this example the flange 20, a depression 22 is formed over the entire circumference. This depression has an axial length of the desired axial shift stroke of driving wheel 1, i.e., approximately the length of each of the ranges 17 or 18 on the catches 2. The surface of the other flange 21 (in this example) lying opposite this depression 22 is provided with a projection 23, which engages in the depression 22 and limits the axial shifting movement of the flange 20 relative to the flange 21.

Both of the axially-shifted positions of the catches 2 can be seen in FIGS. 5 and 6. In FIG. 5 the functional position of the apparatus is shown for the operation exclusively under the control of the driving wheel 1. The clamps 3A, 3B are located in range 17 of the catches. In this position the driving wheel 1 is pulled out, and projection 23 on flange 21 lies against the bottom groove of the depression 22 on the neck-shaped flange 20. In FIG. 6, the position is shown in which the clamps 3A, 3B lie in the range 18 and the hand wheel (driving wheel 1) is depressed in along the axis. In this position the pinion wheel 8 is disengaged, freely turnable and the seat can be freely tilted. Since the pressed-in position of the hand wheel is only necessary in case of a special need (e.g. to enable the ingress or egress of passengers) and therefore only temporary, whereas the pulled-out position is for normal operation, a compression spring is positioned between the axially shifted driving wheel 1 and the clamp ring 5, whose resistance must be overcome when the driving wheel 1 is pressed in. By means of the compression spring 24, the driving wheel 1 is held in the normal position of use, i.e. axially pulled out for performing adjustment of the seat back.

According to the embodiment depicted in FIG. 2, the compression spring 24 is positioned in another location to engage the pinion wheel 8 and a front surface of the flange 20. The compression spring 24 is located to the inside of the flange 21 formed on the pinion wheel 8. To improve the guiding action, an inner extension 25 is formed on the flange 20 on the driving wheel 1 in the axial direction.

According to a further example which is not shown here, a spring-loaded stopping notch can be arranged on the driving wheel 1 (hand wheel), that can engage in two different notch positions, for example on the flange 21. The hand wheel would be releasably held with this notch in the desired axial pushed in or axial pulled out position.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. Apparatus comprising:
    a driven member rotatable about an axis of rotation;
    a driving member, including catch members, rotatable about said axis and being shiftable along said axis between first and second axial positions;
    a clamping ring rotatable about said axis and spaced radially from said driven member to form a space therebetween, said clamping ring arranged to be rotated by said driving member; and
    clamping assemblies disposed in said space in circumferentially spaced relationship, each clamping assembly comprising a pair of circumferentially spaced clamps and a spring disposed circumferentially between said clamps, said spring biasing said clamps away from one another into clamping relationship with surfaces of said clamping ring and said driven member for interconnecting said clamping ring and driven member for common rotation when said driving member is in said first axial position, and for opposing rotation of said driven member relative to said driving member when said driving member is in said first axial position, said catch members being engageable with said clamps of said clamping assemblies when said driving member is in said second axial position, for pushing said clamps toward one another against the bias of said spring and out of their clamping positions to enable said driven member to rotate relative to said driving member.

2. The apparatus according to claim 1, wherein said catch members are arranged in pairs, each pair of catch members straddling a respective clamping assembly.

3. The apparatus according to claim 2, wherein first portions of each pair of catch members engage said clamps in said first axial position of said driving member, and second positions of each pair of catch members engage said clamps in said second axial position of said driving member, said first portions being spaced farther apart than said second portions.

4. The apparatus according to claim 3, wherein said clamps comprise rollers having longitudinal axes extending parallel to said axis of rotation, each of said first and second axial positions of said catch members having an axial length substantially as long as each roller.

5. The apparatus according to claim 4, wherein said clamping ring includes pairs of inclined surfaces, each of said clamping assemblies being associated with a respective pair of said inclined surfaces such that said spring pushes said catches into wedging relationship between a surface of said driven member and a respective one of said inclined surfaces.

6. The apparatus according to claim 1, wherein said driven member includes a first flange extending parallel to said axis, and said drive member includes a second flange extending parallel to said axis, said first and second flanges including radial surfaces engageable with one another for limiting an extent of axial movement of said driving member relative to said driven member in at least one axial direction.

7. The apparatus according to claim 6, wherein said radial surfaces are engageable with one another for limiting an extent of axial movement of said driving member relative to said driven member in both axial directions.

8. The apparatus according to claim 6, wherein said spring constitutes a first spring and further including a second spring extending between said driving and driven members at a location radially inwardly of said first and second flanges for biasing said driving member to said first axial position.

9. The apparatus according to claim 6, wherein said spring constitutes a first spring and further including a second spring extending between a surface on one of said driving and driven members and a surface on an end of said flange of the other of said driving and driven members for biasing said driving member to said first axial position.

10. The apparatus according to claim 9 wherein said flange of said one of said driving and driven members is situated for guiding said second spring.

11. The apparatus according to claim 1, wherein said spring constitutes a first spring and further including a second spring for biasing said driving member to one of said first and second axial positions.

12. The apparatus according to claim 11, wherein said second spring biases said driving member to said first axial position.

13. The apparatus according to claim 11, wherein said second spring comprises a compression spring extending between said driving and driven members.

14. The apparatus according to claim 1 wherein said catch members are arranged radially between said clamping ring and said driven member, said clamping ring disposed radially outwardly of said driven member.

15. The apparatus according to claim 14 further including an axle connected for rotation with said clamping ring and arranged coaxially with said axis said driven member being rotatably mounted on said axle.

16. The apparatus according to claim 1, wherein said driven member and clamping ring are clamped for common rotation in both directions of rotation when said driving member is in its first axial position.

* * * * *